United States Patent [19]
Hicks

[11] 3,920,156
[45] Nov. 18, 1975

[54] INCREMENTAL BUTTER DISPENSER

[76] Inventor: Leslie E. Hicks, c/o Byron H. Robinough P.O. Box 385, LaPine, Oreg. 97739

[22] Filed: Feb. 24, 1975

[21] Appl. No.: 552,114

[52] U.S. Cl. ............... 222/80; 222/326; 222/391; 222/405; 30/115
[51] Int. Cl.² .......................................... B67B 7/24
[58] Field of Search ............ 222/80, 326, 386, 391, 222/405; 30/115, 116

[56] References Cited
UNITED STATES PATENTS

| | | | |
|---|---|---|---|
| 2,122,523 | 7/1938 | Hulskamp | 222/326 X |
| 2,580,864 | 1/1952 | Upright | 30/115 X |

Primary Examiner—Robert B. Reeves
Assistant Examiner—Hadd Lane
Attorney, Agent, or Firm—Chernoff & Vilhauer

[57] ABSTRACT

A dispenser for butter or other spreadable foodstuffs comprising an elongate vertical housing defining a substantially parallelepiped chamber open at the top and bottom, and a square-faced piston movably disposed within the chamber for incrementally advancing a stick of butter enclosed therein until a predetermined quantity of the butter protrudes from the top of the chamber. A spatula having a blade with width dimensions corresponding approximately to the width dimensions of an area enclosed by a generally U-shaped, walled enclosure formed part way around the top of the housing is demountably attached to the housing to facilitate removal of the butter as it protrudes from the chamber into the walled enclosure. While in the chamber, the butter stick is protected from contamination at its lower end by the face of the piston and at its upper end by a cap member removably fitted over the top of the housing. In one embodiment, the piston is vertically self-supporting and is advanced through the chamber by lowering the housing therearound. In another embodiment, the housing is vertically self-supporting and the piston is advanced therethrough by a lever-operated pawl mounted on the housing and positionable to engage and upwardly advance a multi-toothed ratchet strip formed along one side of the piston.

9 Claims, 6 Drawing Figures

INCREMENTAL BUTTER DISPENSER

BACKGROUND OF THE INVENTION

The present invention relates to a device, suitable for use in the home, for incrementally dispensing a stick of butter or other similarly prepared, spreadable food product. Several devices for incrementally dispensing a spreadable foodstuff, such as butter or cheese, have been developed in the past. Among these are the devices disclosed in Miller U.S. Pat. No. 2,216,980, Kennedy U.S. Pat. NO. 3,178,076, Upright U.S. Pat. NO. 2,580,864, Hart U.S. Pat. No. 2,737,721 and Wild U.S. Pat. No. 3,750,913. To date, however, no device has been developed whereby a quantity of foodstuff, incrementally advanced to protrude from the device, may be readily removed therefrom and applied directly to an article of food, for example, by removing a pat of butter or cheese and spreading it directly on a piece of toast or placing it on the user's plate for subsequent use, without either bringing the article of food or plate into contact with the dispenser or vice-versa.

The devices disclosed in the patents to Kennedy, Upright, Hart and Wild, are all capable of dispensing an incremental quantity of a butter stick directly onto a piece of toast. Once the butter is deposited on the toast, however, it must then be spread by other means, such as the user's knife. The Kennedy device, if used in the manner shown in FIG. 8 of the patent to both dispense and spread a quantity of a stick of butter onto a piece of toast, would soon accumulate toast crumbs and other foreign matter over the exposed face of the butter stick, around the dispensing end of the dispenser and inside the dispenser cap, thereby increasing the risk of contamination to the butter remaining in the dispenser and requiring that the dispenser and its cap be cleaned after each use.

The dispenser disclosed in the Miller patent is not adapted for ready movement to the user's location and therefore the dispensed quantity of butter must be transported from the dispenser to the user by a plate or other medium. Even if a piece of toast is used as the transporting medium, the butter must still be spread by other means after it has been placed on the toast.

Therefore, a need exists for an incremental-type butter dispenser for home use that, in addition to incrementally dispensing a stick of butter, also provides means by which an incremental quantity of the butter stick may be readily removed from the dispenser and spread directly on a piece of toast or other article of food without requiring that the article of food be transported to the dispenser or that the dispenser be transported to the food, and also eliminates the risk of contamination to the butter remaining in the dispenser.

SUMMARY OF THE INVENTION

The present invention is directed to an incremental dispensing device for use at the home dinner table from which a quantity of a conventional stick of butter or similarly packaged, spreadable foodstuff may be incrementally dispensed and spread directly onto an article of food, such as a piece of toast, without moving the article of food to the dispenser or vice-versa and without exposing the foodstuff remaining in the dispenser to contamination from such article of food. More particularly, the dispensing device comprises an elongate, tubular housing defining a substantially parallelepiped chamber with interior width dimensions approximating but slightly larger than those of a conventional stick of butter, and a piston movably disposed within the chamber and incrementally advancable from one end of the chamber to the other to forcibly advance the stick through the chamber until a quantity of the butter protrudes from the end of the housing. A U-shaped, walled enclosure is formed part way around the top end of the housing from which the butter protrudes. The interior dimensions of the enclosure are somewhat larger than those of the butter-holding chamber, and the sides of the enclosure may be inscribed with numerical graduations to accurately indicate the quantity of butter protruding thereinto. As the butter stick is advanced, the quantity of butter protruding from the top end of the chamber into the walled enclosure may be removed from the dispenser by inserting the blade of a specially configured spatula into the open side of the U-shaped enclosure to sever the protruding quantity of butter from the remainder of the stick. The blade of the spatula has a width dimension slightly smaller than the interior width of the U-shaped enclosure and greater than the interior width of the butter-holding chamber to permit the blade to be matingly inserted into the enclosure and slid supportably over the open top of the chamber to slice and lift the protruding quantity of butter from the dispenser as a pat. Once on the spatula blade, the pat of butter may be readily spread directly onto a piece of toast or other foodstuff, or placed on the user's plate for later use.

When the dispenser is not in use, the butter is protected from contamination at one end by the piston and at the other end by a removable cap formed to fit closely around the U-shaped enclosure. During use, since the exposed pat of butter may be removed from the dispenser and spread on another foodstuff by the specially-shaped spatula rather than by moving the dispenser itself over the article of food, the butter remaining in the dispenser is unlikely to become covered with crumbs or other foreign matter from the second article of food. When the butter stick has been completely dispensed, the piston may be either removed from the dispenser to permit washing thereof, or withdrawn to its initial position thereby permitting a new stick of butter to be inserted into the chamber and incrementally dispensed as before. A hook is provided at one side of the housing to secure the bladed spatula when the dispenser is not in use.

In one embodiment of the present invention, the piston is an integral part of the dispenser base and adapted to be vertically self-supporting. Advancement of the piston through the chamber is achieved by incrementally lowering the housing around the piston against the frictional force existing between the butter and the chamber walls. In another embodiment, the housing itself is adapted to be vertically self-supporting and the piston is advanced therethrough by a hand-operable lever pivotally mounted at the side of the housing. A pawl attached to the base of this lever selectively engages the teeth of a multi-toothed ratchet strip formed along one side of the piston, thereby permitting each movement of the lever to advance the piston one tooth of the ratchet strip. A second pawl attached to the base of the piston engages a second ratchet strip formed along one interior wall of the chamber to maintain the piston at each new incremental position once the lever is released. When the piston has been advanced a distance sufficient to completely dispense a butter stick from within the chamber, it may be readily removed from the same end of the chamber as the butter stick and reinserted from the opposite end following cleaning of the dispenser components and the insertion of a new stick of butter into the chamber. Both embodiments of the present invention permit a pat of butter to be incrementally dispensed and applied directly to a second article of food, such as a piece of toast or a cracker, without either transporting the second article of food to the dispenser or transporting the dispenser to the article of food. The only portion of the dispenser coming in contact with the user's food is the blade spatula, an item that is easily cleanable after each use thereby protecting the dispenser and the butter or other spreadable foodstuff contained therein from contamination. In addition, the component parts of the dispenser are of simple construction and readily disassembleable to facilitate their easy and thorough cleaning.

It is therefore a principal objective of the present invention to provide a food dispenser for home use from which a quantity of a spreadable foodstuff may be incrementally removed and spread over a second article of food without either transporting the second article of food to the dispenser or transporting the dispenser to the second article of food.

It is an additional objective of the present invention to provide a means for incrementally dispensing and spreading a predetermined portion of such spreadable foodstuff onto a second article of food without exposing the foodstuff remaining in the dispenser to contamination from the article of food.

It is a principal feature of the present invention that a foodstuff may be incrementally dispensed in predetermined amounts.

It is an additional feature of the present invention that the component parts forming the dispenser may be readily disassembled for cleaning.

The foregoing objectives, features and advantages of the present invention will be more readily understood upon consideration of the following detailed description of the invention taken in conjunction with the accompanying drawings.

DETAILED DESCRIPTION OF THE INVENTION

Figure 1:
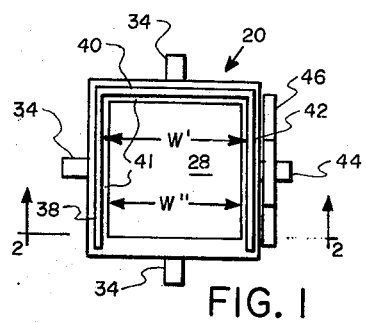
FIG. 1 is a top view of an exemplary embodiment of the incremental dispenser of the present invention, with cap removed, wherein the piston is an integral part of the base.
Figure 2:
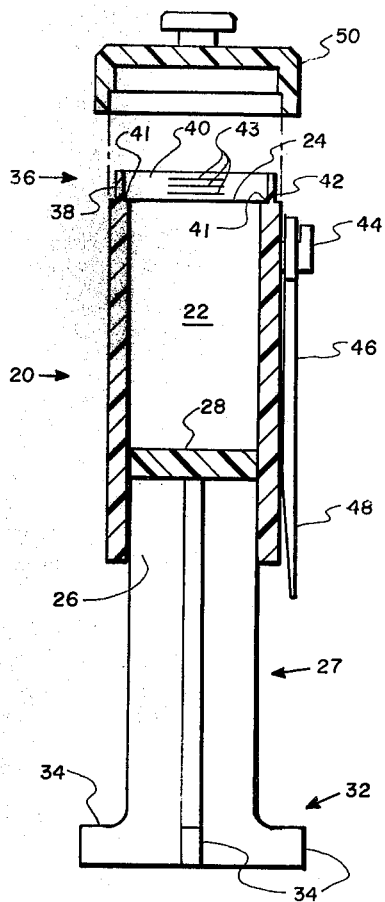
FIG. 2 is a partially-sectioned elevation of the dispenser embodiment of FIG. 1 taken along line 2—2.
Figure 3:
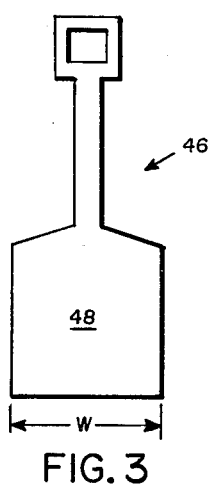
FIG. 3 is a top plan view of the spatula component of the incremental dispenser of the present invention.

Referring to FIGS. 1 through 3, one embodiment of the dispensing device of the present invention is seen to comprise an elongate tubular housing 20 defining a substantially parallelepiped chamber 22 open at its top 24 and at its bottom 26 matingly fitted over an elongate base member 27 the top of which defines a piston face 28 slideable within the chamber. A plurality of feet-like projections 34 are formed at the lower end 32 of base member 27 permitting the entire device to be vertically self-supporting. Base member 27 and piston face 28 have dimensions closely approximating but slightly less than the interior dimensions of chamber 22 such that the engagement between the base member and the chamber is sufficiently free to permit the piston to be advanced through the chamber by a downward force applied to the housing. The interior dimensions of chamber 22 are slightly greater than those of a conventional butter stick so that, when the stick is inserted and some presure applied to the stick by the piston, the stick will expand slightly into contact with the chamber walls. Such contact prevents the housing from sliding downwardly over the base member under its own weight. Formed around three sides of the top of the housing 20 is a U-shaped walled enclosure 36 comprising side walls 38, 40 and 42 enclosing an area slightly larger than the interior cross-section of chamber 22 so as to define a ledge 41 separating the top of the chamber 22 from the U-shaped enclosure 36. At one side of housing 20, removably mounted on a hook 44 provided therefor, is a rectangular-bladed spatula 46, shown more clearly in FIG. 3, the blade 48 of which has a width $w$ dimension slightly less than the corresponding width $w'$ of the area enclosed by enclosure 36, as indicated in FIG. 1, and greater than the corresponding interior width $w''$ of chamber 22. These width relationships permit the blade to be matingly inserted into the enclosure 36 through the opening formed between side walls 38 and 42, and slid supportably over the ledge 41 which is part of the open top 24 of chamber 22. Graduations such as 43 may be marked on an interior wall of the enclosure 36 to indicate to the user the exact amount of butter or other spreadable foodstuff protruding from the top of the chamber 22, which can be helpful for diet control, determining proper recipe amounts, etc. Completing the assembly is a cap 50 configured to fit over the top of the housing and the U-shaped enclosure to sealingly cover the top of the chamber when the dispenser is not in use.

Figure 4:
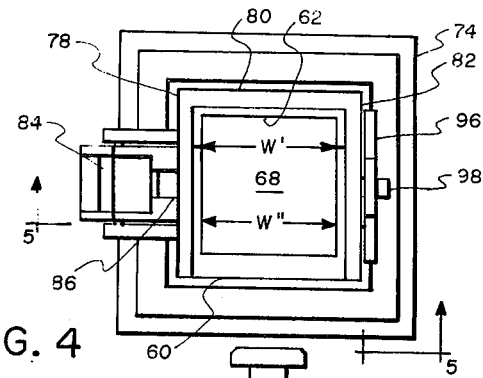
FIG. 4 is a top view of an alternate embodiment of the incremental dispenser of the present invention, with cap removed, employing a ratchet mechanism for advancing the piston.
Figure 5:
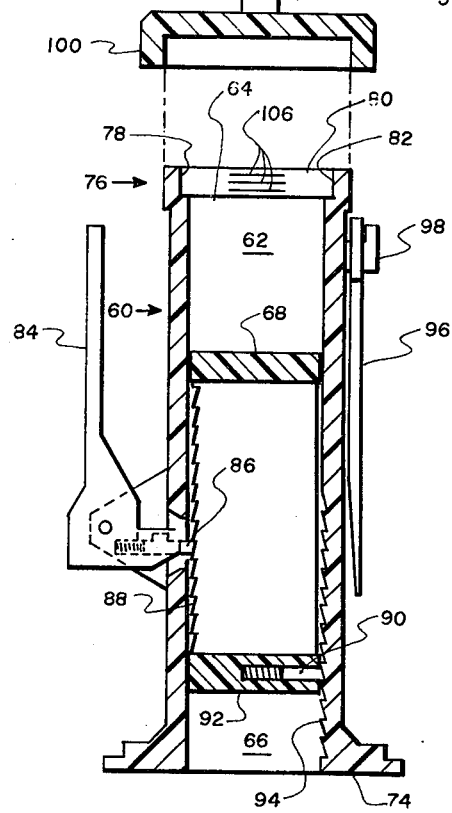
FIG. 5 is a sectional elevation of the dispenser embodiment of FIG. 4 taken along line 5—5.

A second embodiment of the dispensing device of the present invention is shown in FIGS. 4 and 5 to comprise an elongate tubular housing 60 defining a substantially parallelepiped chamber 62 open at its top 64 and at its bottom 66 within which is movably disposed an elongate piston 68. The bottom 66 of housing 60 extends laterally to form a base 74 of sufficient width to permit the housing to be vertically self-supporting. Formed around three sides of the top 64 of the housing is a U-shaped enclosure 76 comprising sides 78, 80 and 82 and enclosing an area slightly larger than the interior cross-section of chamber 62, similar to the previous embodiment. Pivotally mounted at one side of housing 60 is a hand-operable lever 84 with an associated spring-biased pawl 86 for selective engagement with a tooth of a multi-toothed ratchet strip 88 formed along one side of the piston 68. Each outward pump-like movement of lever 84 will engage the pawl 86 with one of the teeth of ratchet strip 88 and force the piston 68 upwardly a distance corresponding to the spacing between the ratchet teeth. At each new position of the piston, a second spring-biased pawl 90 attached to the base 92 of the piston will engage a tooth of a second ratchet strip 94 formed along one side of chamber 62, thereby preventing the piston from moving downwardly as the lever is released. This interaction of pawls 86 and 90 with their respective ratchet strips 88 and 94 permits piston 68 to be incrementally advanced upwardly with each successive operation of the lever 84. A rectangular-bladed spatula 96 similar to the spatula 46 described above and shown in FIG. 3, and having a similar width relationship to the width of the area enclosed by enclosure 76 and the interior width of chamber 62, is removably mounted at one side of the housing 60 on a hook 98 provided thereof. As with the first embodiment, the assembly is completed by a cap 100 configured to matingly enclose the U-shaped enclosure 76 at the top of housing 60 and effectively seal the top 64 of chamber 62.

Figure 6:
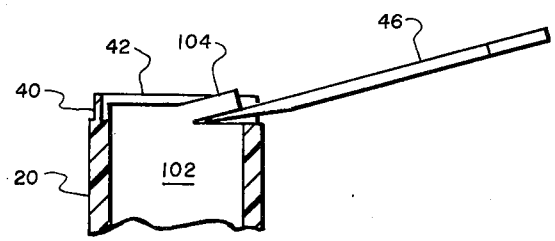
FIG. 6 is a sectional elevation view of the top of the dispenser illustrating the removal of the spreadable foodstuff by means of the spatula.

In operation, both embodiments of the present invention permit a conventional stick of butter 102 or similarly packaged spreadable foodstuff enclosed within the chamber defined by the housing to be incrementally advanced therethrough until a quantity of the butter protrudes beyond the top of the chamber and into the U-shaped enclosure. The generally wedge-shaped cutting edge of the spatula is then employed to slice the protruding quantity of the butter by inserting the blade of the spatula into the U-shaped enclosure of, for example, the first embodiment at an angle, as shown in FIG. 6, and moving it slidingly supported by the top of the chamber through the protruding butter. The wall 40 of the U-shaped enclosure prevents the butter from merely being pushed ahead of the spatula, thereby transferring the butter as a pat 104 from the butter stick to the spatula. Once on the spatula, the pat of butter may be directly transported to a second article of food, such as a piece of toast, and spread thereon.

With the first embodiment, the stick of butter is advanced through the chamber 22 by the user exerting a downward force on the housing 20, thereby forcing piston face 28 relatively upward therethrough. Numerical graduations 43 inscribed on the inner surface of enclosure 36, or alternatively along an edge of the base 27 facilitate the advancement of a predetermined quantity of butter into the enclosure. The presence of such numerical indicia is especially helpful when the dispenser of the present invention is used to dispense butter in predetermined amounts for cooking purposes. When all of the butter stick has been dispensed, base member 27 may be withdrawn in a reverse direction permitting the device to be disassembled for cleaning and refilling.

With the dispensing device exemplified by the second embodiment, the stick of butter 102 enclosed within the chamber 62 will be advanced upwardly with each operation of the lever 84 until a quantity of the butter protrudes from the top 64 of the chamber into the U-shaped enclosure 76. As the butter protrudes into the enclosure, it may be removed as described above for the first embodiment and applied directly to a second article of food by the specially shaped spatula 96. Also as with the first embodiment, numerical graduations 106 may be inscribed on the inner surface of an enclosure wall, thereby permitting the butter to be dispensed in predetermined quantities by modulated actuation of the lever 84. Alternatively, the teeth of ratchet strip 88 along one side of piston 68 may be spaced such that each complete stroke of the lever 84 will advance the piston 68 to dispense a predetermined, commonly used quantity of butter.

When all the butter has been dispensed from the chamber 62, leaving piston 68 in its extreme upward position, the piston may be removed by continued forward movement through the chamber, either by repeatedly operating lever 84 or by pushing the piston upwardly from below until it can be grasped by the fingers and removed through the top of the housing 60. With piston 68 thus removed, both the piston and the housing may be cleaned before a new stick of butter is inserted into the chamber 62.

All components of the dispensing device of the present invention, with the exception of the two pawl-biasing springs of the second embodiment, may be made of any suitable rigid material such as plastic or wood. Although the chamber of the dispensing device of the present invention has been described herein as having a substantially rectangular cross-section conforming to that of a conventional butter stick, it is understood that other cross-sections may be employed without departing from the invention, such as a circular cross-section for the dispensation of certain varieties of cheeses.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A device for incrementally dispensing a spreadable foodstuff comprising:
   a. an elongate housing defining a chamber open at both ends and having interior dimensions sufficient to matingly enclose a conventional stick of butter or similar spreadable foodstuff therein;
   b. wall means projecting longitudinally from a portion of the perimeter of one of said open ends of said chamber for defining the side of an exterior space having a width greater than the corresponding interior width of said open end of said chamber, said space having an opening in at least one side thereof which is also wider than the corresponding interior width of said open end of said chamber;
   c. means for advancing said stick of spreadable foodstuff through said chamber until a predetermined quantity of said foodstuff protrudes from said chamber into said open-sided space; and
   d. spatula means having a blade insertable into said opening, said blade being of a width greater than the corresponding interior width of said chamber, for slicing said quantity of protruding foodstuff from said stick.

2. The device of claim 1 wherein said projecting wall means is generally U-shaped, defining an enclosed space open on one side having a width greater than the corresponding interior width of said chamber, said blade of said spatula means having a width less than said width of said enclosed space and greater than said interior width of said chamber.

3. The device of claim 1 wherein said foodstuff advancing means includes a vertically self-supporting base member, the upper end of which includes a piston movably disposed within said chamber, for supporting said housing in a vertically upright position and for supporting said stick of butter in said chamber.

4. The device of claim 1 wherein said housing is vertically self-supporting and wherein said foodstuff advancing means includes an elongate piston movably disposed within said chamber and piston actuating means mounted on said housing for imparting upward vertical movement to said piston relative to said housing.

5. The device of claim 4 wherein said piston has a multi-toothed ratchet strip formed along its length and wherein said piston actuating means includes a hand-operable lever pivotally mounted on said housing and having a springbiased pawl for engaging said ratchet strip.

6. The device of claim 5 wherein said housing has a multi-toothed ratchet strip formed along one side of said chamber and wherein said piston has a spring-biased pawl for engaging said ratchet strip to prevent the downward movement of said piston through said chamber.

7. The device of claim 1 including graduated indicia formed on said device for indicating the quantity of said foodstuff protruding from said chamber into said space.

8. The device of claim 7 wherein said graduated indicia are formed on said projecting wall means.

9. The device of claim 1 wherein said housing is of sufficient length to define a chamber capable of enclosing more than one stick of said foodstuff disposed end to end in a line therein.

* * * * *